2,404,068
Patented Oct. 1, 1968

3,404,068
COMPOSITION FOR COMPACTING SOIL
Lawrence M. Batistoni, Bakersfield, Calif., assignor to Zymak Biochemical Corp., a Puerto Rican corporation
No Drawing. Continuation of applications Ser. No. 270,179, Apr. 3, 1963, and Ser. No. 532,816, Mar. 8, 1966. This application Dec. 1, 1966, Ser. No. 598,513
5 Claims. (Cl. 195—61)

This application is a continuation of Ser. No. 270,179, filed Apr. 3, 1963, and Ser. No. 532,816, filed Mar. 8, 1966, both now abandoned.

This invention relates generally to a method and means for the compaction of soil or the like, and is particularly directed to a method and formulation for the compaction of soil, sand, aggregate, and the like, based on enzymatic treatment.

Compaction of soil, sand and aggregate is generally achieved by watering down a layer of soil and rolling it with a heavy roller. In many instances, however, voids remain in the soil and render the compaction insufficient for the later concrete foundations to be laid thereover. More specifically, a compaction of 89–90 (a number equal to the percentage of weight of one cubic foot of compacted soil compared to one cubic foot of sand) can be obtained by merely following the above outlined procedure. In many cases, however, a compaction of 95 or better is required for the foundation of various construction projects, such as homes, office buildings, and highways.

Bearing in mind the foregoing, it is a major object of this invention to provide a method and article of manufacture which aids in the compaction of soil and the like.

It is a further object of the present invention to provide a method and article of manufacture based on enzymatic action for the compaction of soil and the like to a compaction of 95 or better.

These and other objects of the invention will be clearly understood by referring to the following detailed description.

The following ingredients are preferably intermixed in the following preferred proportions:

Solution A

| | Parts by weight |
|---|---|
| Seaweed | 1.5–2 |
| Magnesium sulphate | 1.5–2 |
| Manganese sulphate | 1.5–2 |
| Dry yeast | 0.5–2 |
| Malt | 5–20 |
| Sucrose: | |
| (a) Black strap molasses | 45–180 |
| (b) Sugar | 25–100 |
| Water | 375–1500 |

The above ingredients are mixed at above 59° F., and maintained at above 59° F. for at least seventy-two hours. The seaweed, magnesium sulphate, and manganese sulfate furnish minerals to the solution, and the malt and dry yeast are active enzymatic agents. Within seventy-two hours, the solution commences to ferment. The molasses and sugar accelerate the fermentation process.

A second Solution B is then admixed with Solution A. Solution B has the following preferred composition:

A wetting agent (or surfactant) is selected from one or more of the following:

(1)(a) Polyoxyethylene partial fatty acid esters (such as Myrj®, manufactured by Atlas Chemical Industries, Inc., Wilmington, Del. or polyoxyethylene 40 monostearate).

(1)(b) A polyoxyethylene fatty alcohol ether, such as Brij®, manufactured by Atlas Chemical Industries, Inc., Wilmington, Del.).

(1)(c) Sodium tetradecyl sulfate (Tergitol 4, manufactured by Carbide & Carbon Chemicals Corporation, New York 17, N.Y.).

(1)(d) Polyethylene glycol, M.W. 300–1500 (e.g., Tergitol NPX, manufactured by Carbide & Carbon Corporation, New York 17, N.Y.).

Total surfactant—200–600 parts by weight.

(2) Oxytetracycline (Terramycin, C. Pfizer & Co., Brooklyn, N.Y., or chlortetracycline hydrochloride (Aureomycin, Lederle)—2–6 parts by weight.

(3) Water—q.s.

Ingredients 1 and 2 of Solution B are admixed thoroughly with water until the ingredients are completely dissolved. Solutions A and B are then admixed, and water added, until a total of 2200–8400 parts, by weight, of solution results.

Ingredient 1 of Solution B comprises various types of surfactants or wetting agents which function as soil penetrants, while Terramycin or Aureomycin, of course, exert an antibiotic action. An antibiotic is found to be required as a control on the fermenting process. The antibiotics listed in chapter 71, Remington's Practice of Pharmacy (Martin & Cook, 1956) may also be employed.

In this way, the enzymatic action of the solution can be maintained over a long period of time, and the solution can be used in compaction of soil over a period of months without deterioration.

The important characteristics of the composition are that it has enzyme producing or fermenting agents, sucrose, a wetting agent, and an antibiotic agent.

A particularly good formulation for use in compaction of high alkaline soil is the following:

Solution A

| | | |
|---|---|---|
| Seaweed | lb | ½ |
| Urea | lb | ½ |
| Magnesium sulfate | lb | ½ |
| Manganese sulfate | lb | ½ |
| Active dry yeast | lb | ½ |
| Black strap molasses | gals | 5 |
| Diastatic malt | lbs | 5 |
| Cane sugar | lbs | 25 |
| Water | lbs | 400 |

Solution B

| | Lbs. |
|---|---|
| Polyoxyethylene ester (Stearox CD, manufactured by Los Angeles Chemical Co., Los Angeles, Calif. | 65 |
| Polyethylene glycol (Tergitol NPX, manufactured by Carbide & Carbon Chemicals Corporation, New York 17, N.Y.) | 65 |
| Sodium tetradecyl sulfate (Tergitol 4, manufactured by Carbide & Carbon Chemicals Corporation, New York 17, N.Y.) | 65 |
| Terramycin (Chas. Pfizer & Co., Brooklyn, N.Y.) | 2 |
| Water | 400 |

Solutions A and B are then admixed and diluted to make a total of 500 gallons of liquid. Each gallon of the resulting solution can then be admixed with from 1000 to 10,000 gallons of water used in the actual compaction. It has been found that the above formulation, when diluted 1000 times with water, increased the compactability of high alkaline soil to above 95, whereas its normal compactability was about 90 (i.e., with the use of water only).

The precise nature of the action of this formulation is not known. In a general way, it is theorized that the enzymatic action "works" on the soil, and causes some decomposition whereby the void spaces, within the interstices of the soil, are reduced.

While several embodiments of my method and means are disclosed herein for obtaining a high degree of compaction, it will be understood that other variants and modifications may be made by those skilled in the art. Hence, I intend to be limited to the claims which follow.

It is claimed:

1. An article of manufacture for the compaction of soil and the like which comprises an aqueous solution containing:
   a fermenting agent selected from the group consisting of dry yeast and malt;
   sucrose;
   a wetting agent for penetrating the soil selected from the group consisting of polyethylene glycol of molecular weight of between 300 to 1500, a polyoxyethylene fatty alcohol ether, sodium tetradecyl sulfate, and a polyoxyethylene partial fatty acid ester; and
   an antibiotic.

2. An article of manufacture for the compaction of soil and the like which comprises an aqueous solution containing:
   a fermenting agent selected from the group consisting of dry yeast and malt;
   sucrose;
   a wetting agent for penetrating the soil selected from the group consisting of polyethylene glycol of molecular weight of between 300 to 1500, a polyoxyethylene fatty alcohol ether, sodium tetradecyl sulfate, and a polyoxyethylene partial fatty acid ester; and
   a tetracycline, wherein the proportions, by weight, of said fermenting agent, sucrose, wetting agent and tetracycline are respectively about 5.5–22 parts, 70–280 parts, 200–600 parts and 2–6 parts.

3. The composition of claim 2 wherein minerals, selected from the group consisting of magnesium sulfate and manganese sulphate, are present in said aqueous solution in the weight proportion of about 1.5 parts to 5.5 parts fermenting agent.

4. The composition of claim 2 wherein mineral is obtained from seaweed, said seaweed being present in the weight proportion of about 0.5–2 parts to 5.5 parts fermenting agent.

5. The composition of claim 1, wherein said antibiotic is tetracycline.

References Cited

UNITED STATES PATENTS

| | | | |
|---|---|---|---|
| 2,197,843 | 4/1940 | Leeuwen | 61—36 |
| 2,314,091 | 3/1943 | Jones | 71—64 |
| 2,378,235 | 6/1945 | Miles | 61—36 |
| 2,436,146 | 2/1948 | Kleinicke | 61—36 |
| 2,867,944 | 1/1959 | Fletcher | 71—1 |

DONALL H. SYLVESTER, *Primary Examiner.*

R. BAJEFSKY, *Assistant Examiner.*